United States Patent [19]

Hardy et al.

[11] Patent Number: 5,762,140
[45] Date of Patent: Jun. 9, 1998

[54] HIGH VISCOSITY LOW FRICTION PRESSURE LOSS WELL TREATING FLUIDS AND METHODS

[75] Inventors: Mary Anne Hardy, Leiderdorp, Netherlands; Charles V. Hunt; Steve C. Harthun, both of Duncan, Okla.

[73] Assignee: Halliburton Energy Services, Inc., Duncan, Okla.

[21] Appl. No.: 740,829

[22] Filed: Nov. 4, 1996

[51] Int. Cl.$^6$ .................................... E21B 33/138
[52] U.S. Cl. .................... 166/295; 166/305.1; 507/216
[58] Field of Search ........................... 166/294, 295, 166/305.1; 507/211, 216, 225, 237

[56] References Cited

U.S. PATENT DOCUMENTS

| | | | |
|---|---|---|---|
| 4,143,715 | 3/1979 | Paulich | 166/308 X |
| 4,169,818 | 10/1979 | DeMartino | 524/43 |
| 4,202,795 | 5/1980 | Burnhan et al. | 166/308 X |
| 4,313,834 | 2/1982 | Harris | 166/307 X |
| 4,664,713 | 5/1987 | Almond et al. | 106/209 |
| 4,799,550 | 1/1989 | Harris et al. | 166/300 |
| 4,982,793 | 1/1991 | Holtmyer et al. | 166/305.1 |
| 5,067,565 | 11/1991 | Holtmyer et al. | 166/305.1 |
| 5,122,549 | 6/1992 | Holtmyer et al. | 523/130 |
| 5,146,986 | 9/1992 | Dalrymple | 166/294 |
| 5,181,568 | 1/1993 | McKown et al. | 166/293 |
| 5,304,620 | 4/1994 | Holtmyer et al. | 527/310 |
| 5,335,726 | 8/1994 | Rodrigues | 166/295 |
| 5,363,916 | 11/1994 | Himes et al. | 166/276 |
| 5,439,057 | 8/1995 | Weaver et al. | 166/295 |
| 5,701,956 | 12/1997 | Hardy et al. | 160/295 |

*Primary Examiner*—Frank Tsay
*Attorney, Agent, or Firm*—Robert A. Kent; Clark Dougherty, Jr.

[57] ABSTRACT

High viscosity well treating fluids having low friction pressure loss when pumped through tubular goods and methods of treating wells using such treating fluids are provided. The treating fluids basically comprise an aqueous fluid, a graft copolymer of hydroxyalkylcellulose and vinyl phosphonic acid, a salt containing a divalent cation and a basic compound for crosslinking the graft copolymer and causing the resulting crosslinked aqueous gel to undergo syneresis.

20 Claims, No Drawings

HIGH VISCOSITY LOW FRICTION PRESSURE LOSS WELL TREATING FLUIDS AND METHODS

BACKGROUND OF THE INVENTION

1. Field of the Invention

The present invention relates generally to high viscosity low friction pressure loss well treating fluids and methods of treating subterranean zones or formations using such fluids.

2. Description of the Prior Art

High viscosity aqueous polymer gels are used in a variety of operations and treatments carried out in subterranean zones or formations including, but not limited to, well completion operations, fluid loss control treatments, production stimulation treatments, formation permeability conformance operations and treatments to reduce water production.

An example of a well completion operation involving the use of a high viscosity polymer gel is gravel packing. In gravel packing operations, solid gravel particles such as sand are carried to the subterranean zone or formation in which a gravel pack is to be placed by a high viscosity polymer gel. That is, the gravel is suspended in the high viscosity gel at the surface and carried to the subterranean zone or formation in which the gravel pack is to be placed. Once the gravel is placed in the zone or formation, the gel is broken (degraded) and returned to the surface. The resulting pack of gravel is placed on the exterior of a perforated or slotted liner or screen which is positioned in and adjacent to the portion of the well bore traversing a zone or formation containing unconsolidated sand. The resulting structure functions as a filter to separate the sand from produced fluids while permitting the fluids to flow into and up the well bore.

An example of a production stimulation treatment utilizing a high viscosity polymer gel is hydraulic fracturing. In hydraulic fracturing treatments, the high viscosity polymer gel is utilized as a fracturing fluid carrying particulate propping agent. The fracturing fluid is pumped through the well bore into a formation to be stimulated at a rate and pressure such that fractures are formed and extended in the formation. The propping agent suspended in the fracturing fluid is deposited in the fractures and the gel is broken and returned to the surface. The propping agent functions to prevent the formed fractures from closing and thereby provide conductive channels through which produced fluids can flow to the well bore.

In both gravel packing operations and production stimulation treatments, the polymer gel treating fluid must have a high enough viscosity to suspend particulate solids and prevent the solids from settling in the well bore during placement. In addition, it is desirable that the treating fluid have a low friction pressure loss, i.e., a low pressure loss caused by friction as the treating fluid is pumped through tubular goods.

In permeability conformance operations, the permeability of one or more formations being subjected to enhanced recovery operations, e.g., water flooding, is conformed utilizing a high viscosity polymer gel. That is, a high viscosity crosslinked polymer gel is placed in high permeability natural fractures and streaks in the formations whereby the permeabilities of the fractures and streaks are reduced to thereby cause at least part of the flooding medium to flow through the less permeable portions of the formations containing hydrocarbons. It is important that the crosslinked polymer gel utilized forms a stiff essentially permanent highly viscoelastic gel after being placed in the treated formations, but have low friction pressure losses as the gel is pumped through tubular goods disposed in well bores penetrating the formations.

The production of salt water with oil and/or gas from wells constitutes a major problem and expense in the production of oil and gas. While oil and gas wells are usually completed in hydrocarbon producing zones, if there is a water bearing zone adjacent to the hydrocarbon producing zone, the higher mobility of the water often allows it to flow into the hydrocarbon producing zone by way of natural fractures and high permeability streaks. In order to reduce the production of such water, a high viscosity crosslinked polymer gel is pumped into the fractures and streaks communicating with the water producing zones so that the flow of water is terminated or reduced. As in permeability conformance operations, it is important that the polymer gel treating fluid be substantially permanent in the treated formation, but have low friction pressure losses during pumping through tubular goods.

While the high viscosity crosslinked polymer gels utilized heretofore for carrying out the above described well operations and treatments have achieved varying degrees of success, the gels have generally suffered from high friction pressure losses and/or have not efficiently terminated the undesirable flow of fluids into or out of subterranean zones or formations. Thus, there is a need for improved high viscosity low friction pressure loss well treating fluids and methods of using such fluids for carrying out operations and treatments in subterranean zones and formations.

SUMMARY OF THE INVENTION

The present invention provides high viscosity low friction pressure loss well treating fluids and methods which meet the needs described above and overcome the deficiencies of the prior art. The improved well treating fluids of this invention are highly viscoelastic crosslinked aqueous polymer gels which incur low friction pressure losses when pumped through tubular goods. The treating fluids are basically comprised of an aqueous fluid, a graft copolymer of hydroxyalkylcellulose and vinyl phosphonic acid present in the treating fluid in an amount in the range of from about 0.075% to about 1.5% by weight of the aqueous fluid therein, one or more salts containing divalent cations present in the treating fluid in an amount in the range of from about 0.15% to about 1.1% by weight of the aqueous fluid therein and one or more basic compounds present in the treating fluid in an amount sufficient to raise the pH of the fluid to a level in the range of from about 7.5 to about 12 whereby the graft copolymer is crosslinked and the resulting crosslinked aqueous gel undergoes syneresis.

The methods of the present invention for treating a subterranean zone or formation penetrated by a well bore are comprised of the steps of preparing an aqueous gel comprised of an aqueous fluid, the graft copolymer described above and one or more salts containing divalent cations; combining one or more basic compounds with the aqueous gel to raise the pH thereof so that the aqueous gel is crosslinked and the resulting crosslinked aqueous gel undergoes syneresis to form a high viscosity treating fluid having low friction pressure losses when pumped through tubular goods; and then pumping the treating fluid through tubular goods and through the well bore into the subterranean zone or formation to be treated.

It is, therefore, a general object of the present invention to provide high viscosity low friction pressure loss well treating fluids and methods.

Other and further objects, features and advantages of the present invention will be readily apparent to those skilled in the art upon a reading of the description of preferred embodiments which follows.

DESCRIPTION OF PREFERRED EMBODIMENTS

As mentioned, high viscosity aqueous polymer gel treating fluids which incur low friction pressure losses and methods of using such treating fluids are provided by the present invention. The treating fluids can be used in a variety of operations and treatments carried out in subterranean zones or formations including well completion operations, fluid loss control treatments, production stimulation treatments, formation permeability conformance operations, treatments to reduce water production and the like.

The improved treating fluids of this invention are basically comprised of an aqueous fluid, a graft copolymer of hydroxyalkylcellulose having a hydroxyalkyl molar substitution of from about 1.5 to about 3 and vinyl phosphonic acid, one or more salts containing divalent cations and one or more basic compounds present in the aqueous fluid in an amount sufficient to raise the pH of the fluid to a level whereby the graft copolymer is crosslinked and the resulting crosslinked aqueous gel undergoes syneresis. In order to provide additional stability to the crosslinked aqueous gel at subterranean formation conditions, it can optionally also contain a hydroxyalkylcellulose polymer.

The graft copolymer described above and the hydroxyalkylcellulose polymer, when used, are dissolved in the aqueous liquid whereby they are hydrated and an aqueous gel is formed. The term "aqueous liquid" is used herein to mean any liquid containing sufficient water to hydrate the copolymer and polymer (if used). The aqueous liquid can be fresh water, salt water, brine or any other aqueous liquid which does not adversely react with one or more of the other components of the treating fluid. The aqueous liquids used in well treating fluids for treating subterranean zones or formations normally contain sodium chloride, potassium chloride, calcium chloride, ammonium chloride, sodium bromide, other bromides, or the like to inhibit the swelling of clays generally found in subterranean formations or to weight the fluid. The pH of the aqueous liquid must be neutral or acidic to hydrate the copolymer and polymer (if used). After hydration, the pH of the aqueous gel formed is generally in the range of from about 1 to about 6, depending upon the aqueous liquid utilized.

As mentioned above, the graft copolymer useful in accordance with the present invention is comprised of hydroxyalkylcellulose having a hydroxyalkyl molar substitution of from about 1.5 to about 3 and having vinyl phosphonic acid monomers grafted thereto. The monomers have the reactive moiety $CH_2=C-$ that is believed to enable the monomers to attach to the hydroxyalkylcellulose.

The alkyl group of the hydroxyalkylcellulose can be ethyl, propyl or mixtures thereof. Preferably, the hydroxyalkylcellulose is hydroxyethylcellulose having a hydroxyethyl molar substitution in the range of from about 1.5 to about 3, most preferably from about 1.8 to about 2.5. The term "molar substitution" is used herein to mean the average number of moles of hydroxyalkyl substituent present per anhydroglucose unit of the cellulose material.

The graft copolymers of hydroxyalkylcellulose and vinyl phosphonate can be prepared utilizing several techniques. In one technique, a graft copolymer is prepared using a redox system comprising ceric ions and nitric acid. The generalized reaction is believed to be represented by the formula:

$$Ce^{IV} + RCH_2OH \rightleftharpoons B \rightarrow Ce^{III} + H^+ + RCH_2O\cdot$$

where B is a ceric-alcohol complex, $RCH_2OH$ is the cellulose derivative and $RCH_2O\cdot$ is a free radical. The polymerization chemical initiator of ceric ions in nitric acid oxidizes 1,2-glycols with the formation of a free radical on the cellulose derivative reducing agent. The free radical produced on the cellulose derivative initiates polymerization with the vinyl group of vinyl phosphonate to produce the graft copolymer. Typically, the graft copolymerizations are carried out in aqueous media wherein the polymer is dissolved or dispersed. The graft copolymers have been prepared in acetone (55% to 90%) and water or methanol (about 70%) and water. Reactions were carried out in a 1 liter kettle with a stirrer or a 1 liter jar at about 20° C. to about 60° C. The ratio of cellulose derivative to aqueous medium ranges from about 1 gram per 100 milliliters to about 1 gram per 2 milliliters. The preferred ratio is from about 1 gram per 6 milliliters to 1 gram per 4 milliliters. The ratio of cellulose derivative to grafted vinyl phosphonate substituent ranges from about 3 grams per milliliter to about 25 grams per milliliter. The preferred ratio is from about 6 grams per milliliter to about 16 grams per milliliter.

The ceric ions utilized for the polymerization initiator may be provided, for example, by salts such as ceric nitrate, ceric sulfate, ceric ammonium nitrate and ceric ammonium sulfate. The preferred ceric initiator of the present invention is a solution of ceric ammonium nitrate in 1 N nitric acid. Ceric ammonium nitrate should be present in an amount of from about 0.00075 mole per 100 milliliter to about 0.005 mole per 100 milliliter reaction medium. The ceric initiator may be added slowly to the reaction material over a time period of about 30 to 90 seconds or longer. Reaction times vary from about 10 minutes to about 20 hours depending on reaction conditions or the particular grafted monomer. Grafting reaction efficiency is generally less than about 50%. After the reaction is complete, the polymerization product is washed with acetone, filtered and dried.

In another technique for preparing the graft copolymer, a redox system comprising the reaction product of hydrogen peroxide with a ferrous salt is utilized. The generalized redox reaction is believed to be represented by the formula:

$$H_2O_2 + Fe^{+2} \rightarrow HO\cdot + HO^- + Fe^{+3}$$

and the generalized initiation reaction is believed to be represented by the general formula:

$$RCH_2OH + HO\cdot \rightarrow H_2O + RCH_2O\cdot$$

An advantage of this initiator is that radical production occurs at a reasonable rate over a wide temperature range whereby the reactions can be carried out at room temperature if desired. The free radical produced on the cellulose derivative initiates polymerization with the vinyl group of the vinyl phosphonate to produce the graft copolymer. Graft copolymers were prepared utilizing this technique in acetone/water mixtures containing from about 55% to about 90% acetone. The polymerization reactions were carried out in a 1 liter kettle with a stirrer or a 1 liter jar at a temperature of from about 20° C. to about 60° C. The ratio of cellulose derivative to aqueous medium ranged from about 1 gram per 100 milliliters to about 1 gram per 2 milliliters. The preferred ratio is from about 1 gram per 2 milliliters to 5 milliliters. The ratio of cellulose derivative to vinyl phosphonate monomer ranged from about 5 to about 40 grams per 1 gram of monomer. The preferred ratio is from about 6 to about 16 grams per 1 gram of monomer.

The ferrous ions utilized in this preparation procedure may be provided, for example, by salts such as ferrous ammonium sulfate, ferrous chloride, ferrous sulfate, ferrous acetate, ferrous oxalate, ferrous acetylacetonate and the like. A preferred source of ferrous ions is ferrous ammonium sulfate. Alternatively, other commonly used metal ion reactants may be utilized in place of the ferrous ions to generate the free radicals necessary to effect grafting and other forms of hydrogen peroxide such as T-butylhydroperoxide can be used. The hydrogen peroxide-ferrous salt initiator may be added slowly to the reaction material over a time period of about 30 to 90 seconds or longer. Reaction times vary from about 15 minutes to about 4 hours depending upon the reaction conditions. Grafting reaction efficiency (% of monomer grafted) is generally less than about 75%. After the reaction is complete, the polymerization product is washed with acetone, filtered and dried.

In a preferred method of effecting the graft polymerization, the polymerization media used is a polyglycol in which the graft copolymer product can be retained in a substantially storage stable slurry form. Typically, the media comprises a polyglycol, such as polypropylene glycol having a molecular weight up to about 1,000, various polyethylene glycols and homopolymers of 1,2-butylene oxide having a molecular weight of from about 200 to about 400 which are present in an amount of from about 70% to about 95% by weight of the media and the remainder generally being water. The media also may comprise tetramethyl ammonium chloride in a similar amount or in admixture with a polyglycol. Preferably, the polyglycol comprises from about 86% to about 92% by weight of the media.

The polymerization reactions can be carried out in a 5 liter kettle with a stirrer at a temperature of from about 20° C. to about 60° C. The ratio of cellulose derivative to media can range from about 1 gram per 100 milliliters to about 1 gram per 2 milliliters. The preferred ratio is from about 1 gram per 2 to 5 milliliters. The media can also include a quantity of a dispersant or thixotropy such as alkyl quaternary ammonium montmorillonite or dimethyldicocoammonium chloride to facilitate dispersion of the polymer in the media and improve suspension properties. The grafting reaction is performed as previously described using an appropriate redox system such as the ferrous salt with a source of peroxide described above. Since the metal ions are not removed from the product by washing as when a dry product is formed, a sequestrant for the metal ions may be added to the slurry at the conclusion of the reaction. The polymerization product remains dispersed or suspended in the media over a period of time facilitating storage and handling.

When the graft hydroxyalkylcellulose-vinyl phosphonate copolymer is dissolved in an aqueous fluid, the copolymer is hydrated and a relatively high viscosity aqueous gel is formed having a pH in the range of from about 1 to about 6. However, the viscosity of the aqueous gel is not so high that it can not be pumped. The graft copolymer of hydroxyalkylcellulose and vinyl phosphonic acid is dissolved in the aqueous fluid used in an amount in the range of from about 0.075% to about 1.5% by weight of the aqueous fluid, preferably from about 0.15% to about 1.1% and most preferably about 0.5%.

As previously mentioned, in order to provide increased stability to the crosslinked polymer gel at subterranean formation temperature and pressure conditions, a hydroxyalkylcellulose polymer is preferably also dissolved in the aqueous fluid. The alkyl group of the hydroxyalkylcellulose polymer can be ethyl, propyl and mixtures thereof. The hydroxyalkylcellulose polymer preferably has a hydroxyalkyl molar substitution from about 1.5 to about 3, most preferably from about 1.8 to about 2.5. The hydroxyalkylcellulose is preferably hydroxyethylcellulose which is commercially available and is usually formed by reacting ethylene oxide with cellulose under extreme alkaline conditions. When a hydroxyalkylcellulose polymer is included in a well treating fluid of this invention, it is dissolved in the aqueous fluid in an amount in the range of from about 0.3% to about 1% by weight of the aqueous fluid.

One or more of a variety of salts containing divalent cations can be utilized in accordance with the present invention. In general, the cation of the salt used may comprise substantially any alkaline earth metal ion or a transition metal ion that will form a halide salt soluble in the aqueous fluid used. Preferably, such salts are selected from the group consisting of calcium, magnesium, aluminum, iron and zinc chlorides. Of these, calcium chloride or magnesium chloride are most preferred. The salt or salts used are added to the aqueous fluid in an amount in the range of from about 0.05% to about 1% by weight of the aqueous fluid, more preferably from about 0.15% to about 0.7%, and most preferably about 0.5%.

The divalent cations of the salt or salts contained in the aqueous gel function to crosslink the graft copolymer in the aqueous gel, but the crosslinking reaction will not take place until the pH of the aqueous gel is raised. This is accomplished by combining one or more basic compounds with the aqueous gel in an amount sufficient to raise the pH of the aqueous gel to a level in the range of from about 6.5 to about 12 whereby the graft copolymer is crosslinked and the resulting crosslinked aqueous gel undergoes syneresis. Any basic compound or mixture of basic compounds can be utilized so long as the compounds do not adversely react with one or more of the other components of the aqueous gel. Preferably, one or more basic compounds are used selected from the group consisting of sodium hydroxide, potassium hydroxide, ammonium hydroxide and amines such as triethanolamine and the like. The particular quantity of the basic compound or compounds which must be combined with the aqueous gel to effect crosslinking of the graft copolymer by the divalent cations depends on the quantity of divalent cations in the aqueous gel. Generally, however, the basic compound or compounds are combined with the aqueous gel in an amount in the range of from about 0.05% to about 3% by weight of the aqueous fluid in the aqueous gel, more preferably from about 0.2% to about 1%, and most preferably about 0.6%.

As will be described further hereinbelow, the well treating fluids of this invention are preferably prepared by combining the graft copolymer, the hydroxyalkylcellulose polymer (if used) and the salt or salts containing divalent cations with the aqueous fluid to form an aqueous gel. Just prior to pumping the treating fluid, the basic compound or compounds utilized are combined with the aqueous gel which causes the graft copolymer to be crosslinked and the resulting crosslinked aqueous gel to undergo syneresis thereby forming a high viscosity well treating fluid having an exceptionally low friction pressure loss when pumped through tubular goods. The syneresis of the crosslinked polymer gel results in the formation of a heterogenous fluid consisting of highly crosslinked and concentrated polymer pieces and free water, i.e., a linear polymer solution, which has little measurable friction pressure loss when extruded through tubular goods and excellent fluid loss control properties. The term "tubular goods" is used herein to mean fluid conduits such as pipe, tubing, casing and the like connected to and utilized in subterranean wells.

Thus, a high viscosity well treating fluid of this invention having a low friction pressure loss when pumped through tubular goods is comprised of an aqueous fluid; a graft copolymer of hydroxyalkylcellulose having a hydroxyalkyl molar substitution of from about 1.5 to about 3 and vinyl phosphonic acid, the copolymer being present in the treating fluid in an amount in the range of from about 0.075% to about 1.5% by weight of the aqueous fluid therein; a salt containing a divalent cation present in the treating fluid in an amount in the range of from about 0.05% to about 1% by weight of the aqueous fluid therein; and a base present in the treating fluid in an amount sufficient to raise the pH of the fluid to a level in the range of from about 6.5 to about 12 whereby the graft copolymer is crosslinked and the resulting crosslinked aqueous gel undergoes syneresis.

A more preferred treating fluid of the present invention is comprised of an aqueous fluid; a graft copolymer of hydroxyethylcellulose having a hydroxyethyl molar substitution in the range of from about 1.8 to about 2.5 and vinyl phosphonic acid, the copolymer being present in the treating fluid in an amount in the range of from about 0.5% by weight of the aqueous fluid therein; hydroxyethylcellulose having a hydroxyethyl molar substitution of about 2.5 present in the treating fluid in an amount of about 0.35% by weight of the aqueous fluid therein; a salt containing a divalent cation selected from the group consisting of calcium chloride and magnesium chloride present in the treating fluid in an amount of about 0.5% by weight of the aqueous fluid therein; and sodium hydroxide present in the treating fluid in an amount of about 0.6% by weight of the aqueous fluid therein whereby the graft copolymer is crosslinked and the resulting crosslinked aqueous gel undergoes syneresis.

The crosslinked aqueous gel can be readily broken by contacting it with an acidic fluid. The acidic fluid can be substantially any fluid having a pH less than that of the crosslinked gel whereby upon contact of the gel with the acidic fluid the pH of the gel is reduced. Examples of such acidic fluids include hydrochloric acid solutions, organic acids such as fumaric acid, acetic acid, citric acid, polyhydroxyacetic acid and the like.

As mentioned above, when the treating fluid of this invention is to be used, for example, in hydraulic fracturing or gravel pack treatments, suitable particulate solids which function as propping agent or gravel are suspended in the treating fluid for downhole placement.

As will be understood by those skilled in the art, the treating fluids of this invention can also contain other conventional additives such as gel stabilizers, gel breakers, clay stabilizers, bactericides, fluid loss additives and the like which do not adversely react with the treating fluids or prevent their use in a desired manner.

The methods of this invention for treating a subterranean zone or formation penetrated by a well bore basically comprise the steps of (1) preparing an aqueous gel comprised of an aqueous fluid, a graft copolymer of hydroxyalkylcellulose having a hydroxyalkyl molar substitution of from about 1.5 to about 3 and vinyl phosphonic acid, the copolymer being present in the aqueous gel in an amount in the range of from about 0.075% to about 1.5% by weight of the aqueous fluid therein and one or more salts containing divalent cations present in the aqueous gel in an amount in the range of from about 0.05% to about 1% by weight of the aqueous fluid therein; (2) combining one or more basic compounds with the aqueous gel in an amount sufficient to raise the pH of the aqueous gel to a level in the range of from about 6.5 to about 12 so that the aqueous gel is crosslinked and the resulting crosslinked aqueous gel undergoes syneresis to form a high viscosity treating fluid having low friction pressure loss when pumped through tubular goods connected to and disposed in the well bore; and (3) pumping the treating fluid through the well bore into the subterranean zone or formation to be treated.

In a more preferred method, an aqueous gel is prepared in accordance with step (1) above comprised of an aqueous fluid, a graft copolymer of hydroxyethylcellulose having a hydroxyethyl molar substitution of from about 1.8 to about 2.5 and vinyl phosphonic acid, the copolymer being present in the aqueous gel in an amount of about 0.5% by weight of the aqueous fluid therein, hydroxyethylcellulose having a hydroxyethyl molar substitution of about 2.5 present in the aqueous gel in an amount of about 0.35% by weight of the aqueous fluid therein and a salt containing a divalent cation selected from the group consisting of calcium chloride and magnesium chloride present in the aqueous gel in an amount of about 0.5% by weight of the aqueous fluid therein. A basic compound comprised of sodium hydroxide is combined with the aqueous gel in accordance with step (2) above in an amount of about 0.6% by weight of the aqueous fluid.

As will be understood by those skilled in the art, the aqueous gel prepared in accordance with step (1) is combined with the basic compound in accordance with step (2) just prior to pumping the treating fluid in accordance with step (3). In a preferred technique, the basic compound is combined with the aqueous gel on-the-fly, i.e., the aqueous gel is pumped through a conduit connected to tubular goods disposed in the well bore, and the basic compound is combined with the aqueous gel in accordance with step (2) by continuously injecting the basic compound into the conduit through which the aqueous gel is pumped.

In order to further illustrate the high viscosity low friction pressure loss well treating fluids and methods of this invention, the following example is given.

EXAMPLE

An aqueous gel was prepared in the laboratory by dissolving a hydroxyethylcellulose (MS 1.8-2.5)-vinyl phosphonic acid graft copolymer and a hydroxyethylcellulose polymer (MS 2.5) in distilled water containing 2% potassium chloride. Magnesium chloride salt was also dissolved in the water in an amount of about 0.5% by weight of the water.

The aqueous gel was crosslinked on-the-fly by injecting a 25% by weight aqueous solution of sodium hydroxide into the aqueous gel, and the resulting crosslinked gel was injected through a friction pressure loss measuring apparatus which included a length of ½" tubing through which the crosslinked gel was flowed. The friction pressure loss of the crosslinked polymer gel of this invention was less than 1 psi. as compared to readings for comparable borate crosslinked aqueous guar gels which had friction pressure losses of from 4 to 15 psi.

A portion of the crosslinked polymer gel of the present invention was also tested in a Dynamic Fluid Loss (DFL) cell containing a high permeability sandstone core at 180° F. The cell incorporated smooth transition endpieces and a cell body designed for 1.5 inch diameter cores. The crosslinked polymer gel allowed an initial spurt of about 6 milliliters and then stopped the flow of fluid through the sandstone core thereby exhibiting excellent fluid loss control properties.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A high viscosity well treating fluid having a low friction pressure loss when pumped through tubular goods comprising:

an aqueous fluid;

a graft copolymer of hydroxyalkylcellulose having a hydroxyalkyl molar substitution of from about 1.5 to about 3 and vinyl phosphonic acid, said copolymer being present in said treating fluid in an amount in the range of from about 0.075% to about 1.5% by weight of said aqueous fluid therein;

a salt containing a divalent cation present in said treating fluid in an amount in the range of from about 0.05% to about 1% by weight of said aqueous fluid therein; and a basic compound present in said aqueous fluid in an amount sufficient to raise the pH of said fluid to a level in the range of from about 6.5 to about 12 whereby said graft copolymer is crosslinked and the resulting crosslinked aqueous gel undergoes syneresis.

2. The treating fluid of claim 1 wherein said salt containing a divalent cation is one or more salts selected from the group consisting of calcium, magnesium, aluminum, iron and zinc chlorides.

3. The treating fluid of claim 1 wherein said basic compound is one or more compounds selected from the group consisting of sodium hydroxide, potassium hydroxide and ammonium hydroxide.

4. The treating fluid of claim 1 which further comprises hydroxyalkylcellulose having a hydroxyalkyl molar substitution in the range of from about 1.5 to about 3 present in said treating fluid in an amount in the range of from about 0.3% to about 1% by weight of said aqueous fluid therein.

5. The treating fluid of claim 1 or 4 wherein the alkyl group of said hydroxyalkylcellulose is selected from the group consisting of ethyl, propyl and mixtures thereof.

6. A high viscosity well treating fluid having a low friction pressure loss when pumped through tubular goods comprising:

an aqueous fluid;

a graft copolymer of hydroxyethylcellulose having a hydroxyethyl molar substitution in the range of from about 1.5 to about 3 and vinylphosphonic acid, said copolymer being present in said treating fluid in an amount of about 0.5% by weight of said aqueous fluid therein;

a salt containing a divalent cation selected from the group consisting of calcium chloride and magnesium chloride present in said treating fluid in an amount of about 0.5% by weight of said aqueous fluid therein; and sodium hydroxide present in said treating fluid in an amount of about 0.6% by weight of said aqueous fluid therein whereby said graft copolymer is crosslinked and the resulting crosslinked aqueous gel undergoes syneresis.

7. The treating fluid of claim 6 which further comprises hydroxyethylcellulose having a hydroxyethyl molar substitution in the range of from about 1.5 to about 3 present in said treating fluid in an amount in the range of from about 0.3% to about 1% by weight of said aqueous fluid therein.

8. The treating fluid of claim 6 wherein said hydroxyethylcellulose has a hydroxyethyl molar substitution of from about 1.8 to about 2.5.

9. The treating fluid of claim 8 which further comprises hydroxyethylcellulose having a hydroxyethyl molar substitution of about 2.5 present in said treating fluid in an amount of about 0.35% by weight of said aqueous fluid therein.

10. A method of treating a subterranean zone or formation penetrated by a well bore comprising the steps of:

(a) preparing an aqueous gel comprised of an aqueous fluid, a graft copolymer of hydroxyalkylcellulose having a hydroxyalkyl molar substitution of from about 1.5 to about 3 and vinyl phosphonic acid present in said aqueous gel in an amount in the range of from about 0.075% to about 1.5% by weight of said aqueous fluid therein, and a salt containing a divalent cation present in said aqueous gel in an amount in the range of from about 0.05% to about 1% by weight of said aqueous fluid therein;

(b) combining a base with said aqueous gel in an amount sufficient to raise the pH of said aqueous gel to a level in the range of from about 6.5 to about 12 so that said aqueous gel is crosslinked and the resulting crosslinked aqueous gel undergoes syneresis to form a high viscosity treating fluid having a low friction pressure loss when pumped through said well bore; and (c) pumping said treating fluid through said well bore into said subterranean zone or formation.

11. The method of claim 10 wherein said salt containing a divalent cation in said aqueous gel is one or more salts selected from the group consisting of calcium, magnesium, aluminum, iron and zinc chlorides.

12. The method of claim 10 wherein said basic compound is one or more compounds selected from the group consisting of sodium hydroxide, potassium hydroxide and ammonium hydroxide.

13. The method of claim 10 wherein said aqueous gel further comprises hydroxyalkylcellulose having a hydroxyalkyl molar substitution in the range of from about 1.5 to about 3 present in said aqueous gel in an amount in the range of from about 0.3% to about 1% by weight of said aqueous fluid therein.

14. The method of claim 10 or 13 wherein the alkyl group of said hydroxyalkylcellulose is selected from the group consisting of ethyl, propyl and mixtures thereof.

15. The method of claim 10 wherein said hydroxyalkylcellulose is hydroxyethylcellulose.

16. The method of claim 15 wherein said hydroxyethylcellulose has a hydroxyethyl molar substitution in the range of from about 1.8 to about 2.5.

17. The method of claim 16 wherein said aqueous gel further comprises hydroxyethylcellulose having a hydroxyethyl molar substitution of about 2.5 present in said aqueous gel in an amount of about 0.35% by weight of said aqueous fluid therein.

18. The method of claim 10 wherein said basic compound is combined with said aqueous gel in accordance with step (b) just prior to pumping said treating fluid in accordance with step (c).

19. The method of claim 18 wherein said treating fluid is pumped through said well bore in accordance with step (c) within tubular goods disposed therein.

20. The method of claim 19 wherein said aqueous gel is pumped through a conduit connected to said tubular goods disposed in said well bore and said basic compound is combined with said aqueous gel in accordance with step (b) by injecting said basic compound into said conduit through which said aqueous gel is pumped.

* * * * *